Patented June 10, 1952

2,600,085

UNITED STATES PATENT OFFICE 2,600,085

TREATMENT OF WINES AND LIKE MATERIALS FOR THEIR CLARIFICATION

John C. van Dyk, Bernardsville, N. J., assignor to The Product Developers, Inc., Bernardsville, N. J., a corporation of New Jersey No Drawing. Application October 7, 1947, Serial No. 778,468

4 Claims. (Cl. 99—35)

The instant invention relates to the treatment of wines and like materials for their clarification and is particularly concerned with a method for stabilizing such materials to prevent tartrate precipitation and maintain the desired taste of the material.

One of the greatest problems in the manufacture of wines and like beverages is to prevent the formation of crystalline flakes in the beverages while they are standing after having been bottled. The common cause of the formation of these flakes and the one with which this invention is concerned is the potassium bitartrate content of such beverages.

This potassium bi-tartrate content has a desirable aspect up to a certain proportion, since it acts as a buffer for the tartaric acid, which latter must be present for the enhancement of flavor. However, the tendency for the potassium bi-tartrate to increase beyond what is needed as a buffer and thus to precipitate out into a flaky formation, is highly undesirable. It, of course, cannot be removed once the beverage is bottled, and it has the effect of rendering the goods unsalable. Thus it is necessary to remove the excess tartrates before bottling the beverage.

The common method heretofore employed to effect this removal was refrigeration. In other words, the beverage material had to be stored for a considerable period of time under refrigerated conditions in order to precipitate out the excess tartrates since the same are less soluble at low temperatures. This precipitate was thereafter removed by filtration. Besides being expensive and time consuming, this method has the additional defect of being likely to cause the loss of a considerable portion of the valuable tartrate components from the beverage.

Another method previously suggested is the regeneration of a carbonaceous zealite bed, by means of a salt or acid until the effluent regenerant and a subsequent wash show the bed to have the proper characteristics for treatment of the wine or comparable material to be passed there through. Then the wine is passed through the bed until the bed loses its ability to properly affect it. The bed must then be regenerated before any further material to be treated can be passed there through. This again is an expensive, time consuming, method which requires very close control.

The method of the instant invention attacks the problem directly, and achieves entirely satisfactory results in an economical and simple manner. The common so-called filter aids, or filter earth, normally employed for assisting in the removal of dirt, or other undesirable solids, are mixed with a cation exchange material, and all of this in proper proportion is added to and mixed with the wine, or comparable material. The cation exchange material is so selected that the potassium ion in the tartrate is exchanged with the hydrogen ion resulting in the undesired potassium bi-tartrate becoming tartaric acid. Thereafter ordinary filtering is effected to remove the filter-aid, suspended dirt, and the exhausted cation exchange resin on which the potassium has replaced the hydrogen and is held by electrical forces, and the job is complete.

It is accordingly a principal object of this invention to correct the undesired reactions which take place during the manufacture of wine and comparable beverages.

Another object of the invention is to provide such correction while maintaining the total amount of buffering intact.

Another object is to materially reduce the expense and time consumed in the treatment of wines to eliminate the tartrate sediment therefrom.

Further and more detailed objects will appear hereinafter, as the description of my invention proceeds.

In the treatment of wine or comparable materials, in accordance with the invention, a mixture of filter material is first prepared for introduction into the wine. For a normal treatment I have found that a mixture of approximately ten (10%) percent active ion exchange material and ninety (90%) percent of an inert filter medium, such as diatomaceous earth, or activated carbon, produces a satisfactory result. This mixture is then introduced into the wine in the range of from $\frac{1}{10}$ of 1% to 2% by volume of wine or filterable liquid depending upon the ash content of the wine before filtration. The percentage of the mixture, within the range, introduced into the wine depends upon the ash content of the wine as shown by analysis. Ash content, as the term known in this art, is the expression of the mineral content of the liquid and could be interpreted in terms of potassium concentration. The greater the ash content, the greater the amount of the mixture to the filterable liquid. The cation exchange material is one of those commonly known such as lignite or other carbonaceous material, or a resinous material having the capacity of taking a salt, such as potassium bi-tartrate, and exchanging or substituting the potassium ion with a hydrogen ion so that the potassium bi-tartrate becomes tartaric acid.

After introduction of the mixture as above stated, the beverage is filtered, and the mixture as it then stands is removed together with the precipitated material, such as pectins, sulphates, carbonates and colloids such as dirt from pipes, tanks, etc. If it is found that there are large amounts of colloids, carbonates, sulphates or other non-ionized precipitate in the beverage, it is necessary to change the proportion of materials making up the mixture by reducing the amount of active ion exchange cation material and increasing the amount of inert filter medium. Should the beverage run high in non-ionized precipitates, the proportion of the filter media to the cation exchange material may run as high as 99% filter media to 1% cation exchange material. This proportion as already pointed out depends upon the analysis of the wine before treatment. Even though the proportion of the cation exchange material is so materially reduced, the potassium will be removed by the action of the cation exchange material and change the potassium bitartrate to tartaric acid while the potassium ions become held in position on the surface of the insoluble cation exchange material.

To remove the dirt and the resulting potassium resin complex from the above treatment of the wine is very simple. It is a one operation procedure which amounts to no more than the usual filtration step. No extra equipment or apparatus is required and no control of the filtering is necessary.

Tests made on wines treated in accordance with this process gave the following results:

MUSCATEL

|  | pH | Ash | Solids | Ppt. at Low Temp. |
|---|---|---|---|---|
|  | Percent | Percent | Percent |  |
| Before treatment | 3.6 | .13 | 26 | Slight. |
| After treatment | 3.44 | .11 | 25 | None. |

SHERRY-MELLOW

| Before treatment | 3.1 | .45 | 13.7 | Slight. |
| After treatment | 3.0 | .35 | 11 | None. |

SHERRY PALE DRY

| Before treatment | 2.9 | .26 | 4.7 | Slight. |
| After treatment | 2.8 | .25 | 4.5 | None. |

SHERRY-COCKTAIL

| Before treatment | 3.2 | .33 | 4.0 | Considerable. |
| After treatment | 3.1 | .26 | 3.9 | None. |

As can be seen from the above results, in each case the wine was improved and there was a substantial reduction in ash and solids, whereas the pH value remained substantially constant. In each case the wine treated was milky and cloudy before treatment, and was clear and sparkling after treatment.

While in the foregoing disclosure the method has been principally considered from the point of view of the treatment of wine, it is, of course, to be understood that the method is applicable to the treatment of other beverages in which the same problem arises. Beverages having the same base as wine of course clearly fall into the category indicated. Thus the use of the word "wine" is to be construed in an illustrative rather than a limiting sense, the intention being to include beverages in the field just referred to.

From the foregoing disclosure it is believed to be apparent that the method of my invention achieves the desired results in a simple and straight forward manner. My method proceeds from an analysis of the wine during the course of manufacture to treat it on the basis of that analysis. Thus, when the normal steps of manufacture are completed, the wine is properly stabilized and no further treatment is necessary.

Having disclosed my invention, what I claim as new and desire to secure Letters Patent for is:

1. A method of treating wine for clarification which comprises, analyzing the wine to determine the tartrate content thereof, forming a mixture comprising a filter aid and a cation exchange material, said cation exchange material being present in sufficient quantity to replace the potassium ions by hydrogen ions in that portion of the tartrate which is in excess of the tartrate needed to buffer the tartaric acid content of the wine, introducing the predetermined quantity of said mixture into the wine, converting a substantial portion of the potassium tartrate present in the wine to tartaric acid while making no substantial change in the pH value of the wine and thereafter filtering the wine to remove the precipitates and ash content therefrom.

2. A method for treating wine for clarification thereof which comprises, determining the tartrate content of the wine by analysis, determining the portion of said tartrate content which is in excess of that needed to buffer the tartaric acid content of the wine, forming a mixture comprising a filter aid and active cation exchange material wherein the cation exchange material is present in sufficient amount to replace the potassium ion in said excess portion of tartrate by hydrogen ions without making any substantial change in the pH value of the wine, introducing said mixture into the wine in proper proportion, and, after said cation exchange material has completed its action, filtering the wine to remove the precipitates and ash content therefrom.

3. The method of treating wine to prevent subsequent formation of tartrate precipitates therein while retaining the acid content in the correct amount to retain the desired flavor, which comprises, determining the excess of potassium tartrate over that necessary to buffer the acid content of the wine, by analyzing the wine, forming a mixture of sufficient active ion exchange material to convert the excess of potassium tartrate to tartaric acid and an inert filter medium, in which mixture the ion exchange material comprises approximately 10% while the inert filter comprises the remainder, introducing the mixture into the wine to be treated and, removing the excess of potassium by exchanging the same with hydrogen ions from the ion exchange material and removing the dirt content by trapping the same in the filter medium after the mixture has performed its function, filtering the wine to remove the mixture as it then stands together with adsorbed materials.

4. A method for treating wine for the clarification thereof which comprises, determining the potassium and total tartrate content of the wine, determining the amount of active cation exchange material needed to remove the calculated excess of potassium in the wine while maintaining the pH value thereof substantially constant, forming a mixture of such cation exchange material and a filter aid wherein such cation exchange material is present within the range of from one percent (1%) to ten percent (10%) of the total of the mixture and wherein the mixture is present in the range of from one-tenth of one percent, ($\frac{1}{10}$ of 1%) to two percent (2%) by volume of the wine, introducing said mixture into the wine and, after said cation exchange material has completed its action, filtering said wine to remove all of said filter aid, suspended impurities and the insoluble potassium salt of the cation exchange material.

JOHN C. van DYK.

REFERENCES CITED

The following references are of record in the file of this patent:

UNITED STATES PATENTS

| Number | Name | Date |
|---|---|---|
| 2,104,501 | Adams et al. | Jan. 4, 1938 |
| 2,151,883 | Adams et al. | Mar. 28, 1939 |
| 2,155,318 | Liebnecht | Apr. 18, 1939 |
| 2,206,007 | Liebnecht | June 25, 1940 |
| 2,251,234 | Swain | July 29, 1941 |
| 2,253,061 | Cole | Aug. 19, 1941 |
| 2,258,216 | Ramage | Oct. 7, 1941 |
| 2,419,628 | Cohen | Apr. 29, 1947 |
| 2,500,171 | Gause | Mar. 14, 1950 |

OTHER REFERENCES

Tiger et al., Demineralizing Solutions by a Two Step Ion Exchange Process, Industrial and Engineering Chemistry, vol. 35, No. 2, Feb. 1943, pp. 186-192.

"Information Sheet on Recovery of Tartrates From Grape Wastes." Paper A 1C-14, Aug. 1943, Agricultural Research Administration, U. S. Dept. of Agriculture. Pages 1 to 10.